H. A. TUTTLE.
REVERSING GEARING.
APPLICATION FILED JAN. 31, 1919.
1,392,984.
Patented Oct. 11, 1921.
3 SHEETS—SHEET 3.
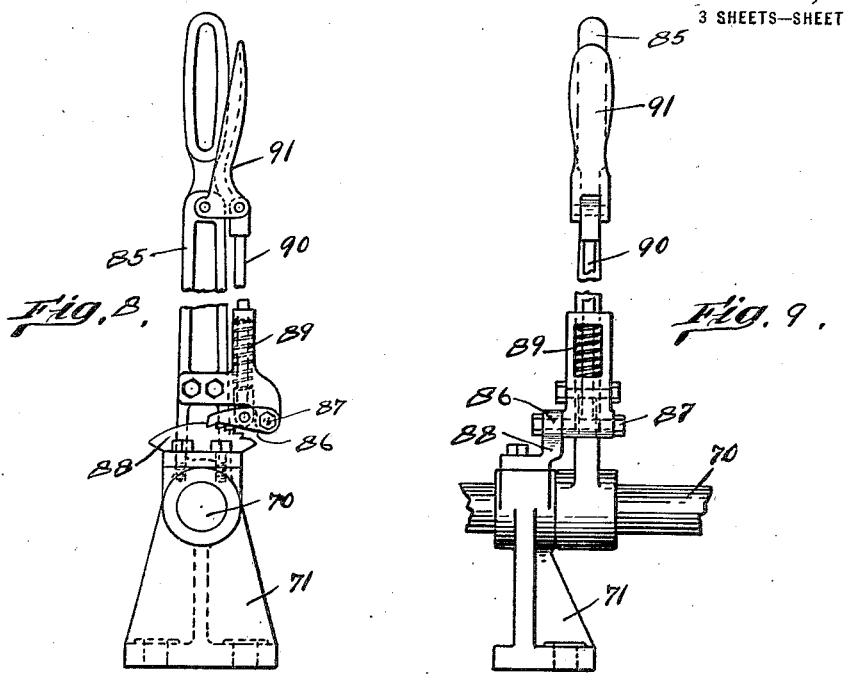
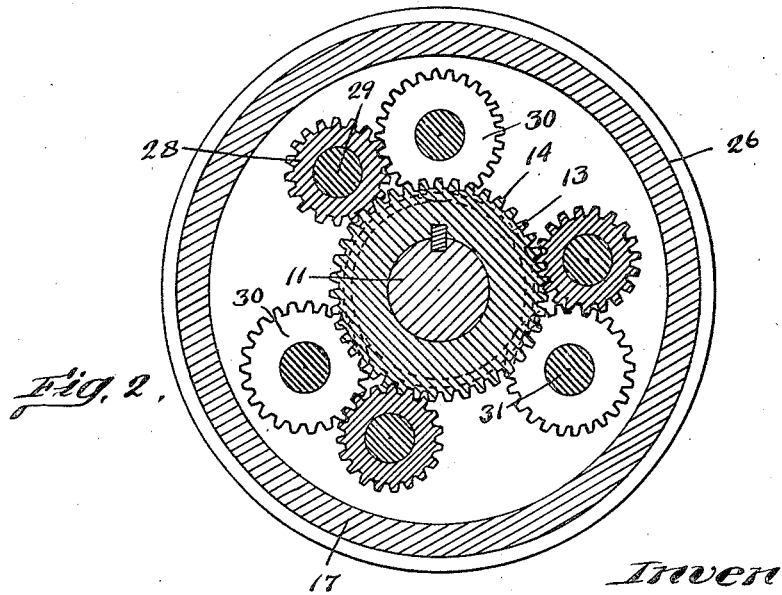
Inventor,
Henry A. Tuttle
by B. J. Noyes
Atty.

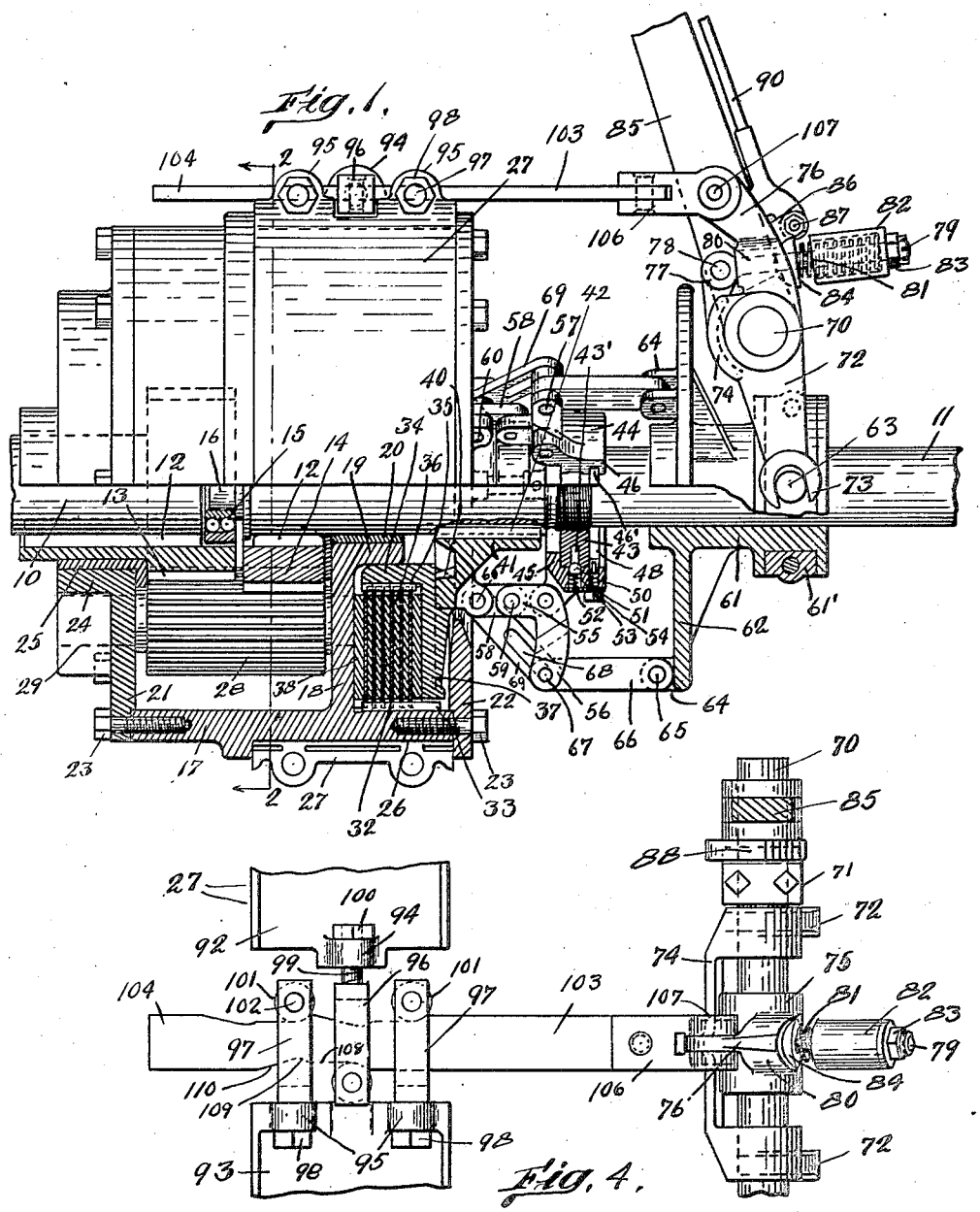

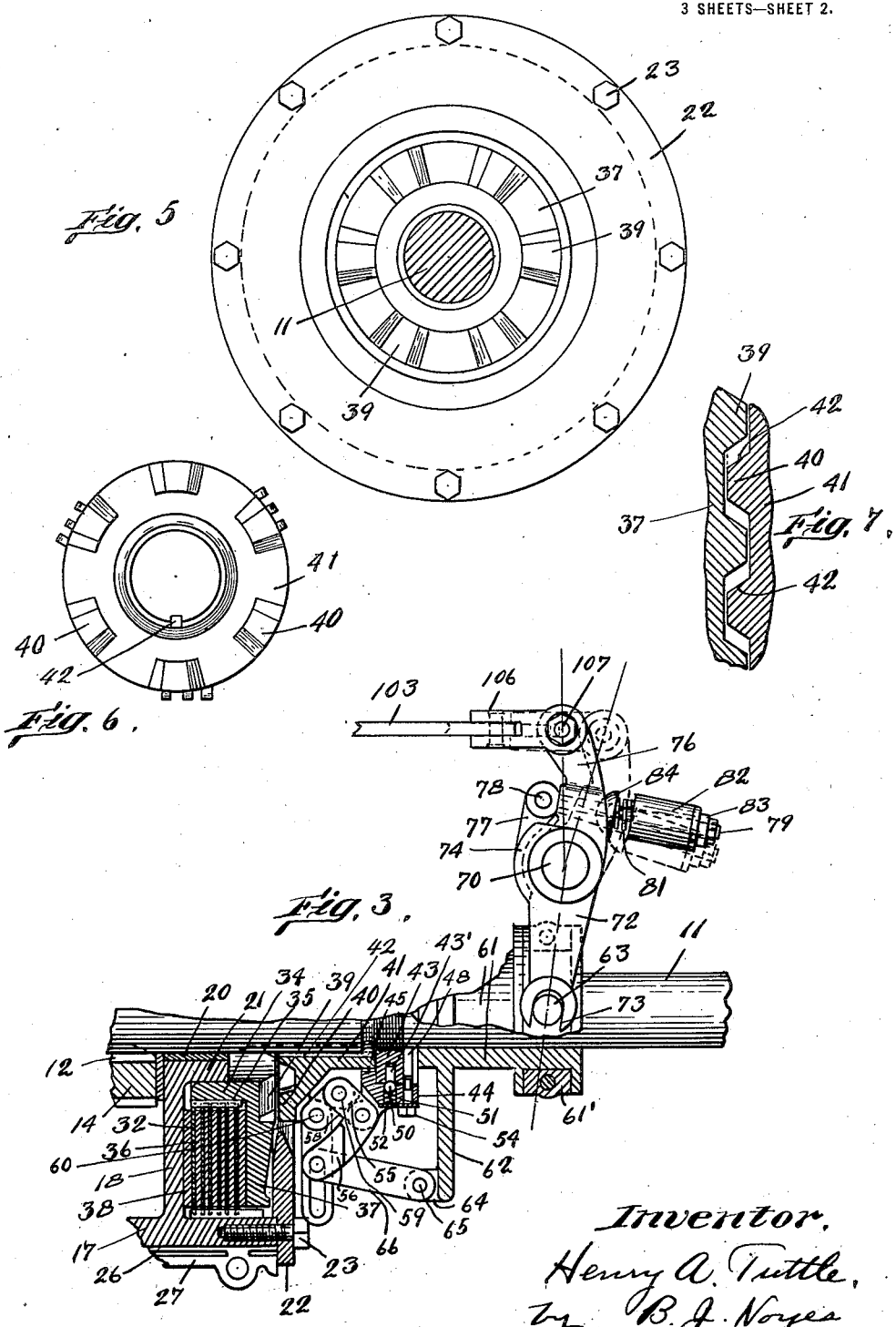

UNITED STATES PATENT OFFICE.

HENRY A. TUTTLE, OF UPTON, MASSACHUSETTS.

REVERSING-GEARING.

1,392,984. Specification of Letters Patent. Patented Oct. 11, 1921.

Application filed January 31, 1919. Serial No. 274,247.

*To all whom it may concern:*

Be it known that I, HENRY A. TUTTLE, a citizen of the United States, and resident of Upton, in the county of Worcester and State of Massachusetts, have invented an Improvement in Reversing-Gearing, of which the following is a specification.

This invention relates to reversing gearing of the type in which two shafts, such as a driving shaft and a driven shaft are adapted to be connected by means, as gearing for reverse drive, and adapted to be connected by means, as a clutch-mechanism for forward drive.

The reversing gearing, herein illustrated, comprises gears secured to the proximate ends of the driving and driven shafts, and in mesh with pinions, supported by a carrier, in the form of a casing, which may inclose them, and a brake-mechanism is associated therewith to secure reverse drive, adapted to restrain said casing against rotation whereby the driving shaft will operate through the gear secured thereon, to rotate the pinions thus maintained against rotation about said shaft, to reversely rotate the driven shaft.

The clutch-mechanism employed to secure forward drive of the driven shaft may comprise a clutch member secured to one of said shafts against relative rotation therewith and adapted to engage a clutch member secured to the casing against relative rotation therewith; and the engagement of said two clutch members serves to lock said casing to one of said shafts against independent relative rotation therewith and thereby serves to lock both of said shafts through the pinions carried by said casing, for simultaneous forward rotation.

Said clutch-mechanism may also comprise a plurality of clutch plates, certain of which are secured in slidable, but against rotative, engagement with the casing, and others of which are secured in slidable but against rotative engagement with a clutch plate carrier or member secured in sliding engagement with one of said shafts; and a movement of said clutch plate carrier toward the casing causes the engagement of the clutch plates and thereby locks the casing and said shaft against relative rotation.

Link and lever mechanism of some form connects the clutch plate carrier or member with a clutch operating member, and considerable pressure is exerted upon the clutch plates to maintain them in engagement for forward drive without slipping.

Although it is essential, for the continued proper operation of the clutch, that there be no slipping, or relative motion, between the clutch plates when the gearing operates in forward drive and which slipping would result in a loss of power in the clutch and cause heating and wearing of the clutch plates, yet it is desirable that slipping may take place between the plates as said plates are moved into engaging position in order that the driven shaft may be gradually brought up to the speed of the driving shaft, after which it should be maintained, by said clutch, against relative rotation therewith.

Said desirable and necessary slipping between the clutch members when the clutch is moved into engaging position soon causes the clutch plates to wear. This wearing of the clutch plates renders ineffective the adjustment of the connecting and operating means employed to force said plates into engagement and results, in effect, in a reduction of pressure exerted upon said plates to a value below that effective in maintaining the plates against slipping when the gearing is operating in forward drive and therefore the slipping of the plates and the consequent wear becomes rapidly worse and renders necessary a continual readjustment to compensate for this wear.

An object of my invention is to provide means, associated with the clutch-mechanism and the operating-mechanism whereby the wear between the clutch plates is continually compensated for automatically, so to speak, whereby the mechanism is always effective in maintaining the clutch plates in engagement without improper slipping or relative motion therebetween and resultant wear of said plates.

To accomplish this object I may provide wedge-shaped means or tapered surfaces connecting the operating mechanism with a clutch member whereby the drive between said clutch member and operating mechanism is through said tapered surfaces and any wear between the clutch plates due to relative rotative motion therebetween operates to cause a relative motion between said tapered surfaces that automatically compensates for such wear without affecting the adjustment of the operating mechanism.

It has been necessary heretofore due to the construction of the clutch operating-mechanism that the pressure exerted between the clutch plates, in their engaged condition, and for any power transmitted by the clutch, shall be always sufficient to enable said clutch to transmit its maximum power without slipping. But when the clutch is operating to transmit less than its maximum power, it is not necessary that pressure shall be exerted between the clutch plates, as this results in subjecting the clutch to greater wear than would be the case if the pressure employed was only such as to cause proper engagement of the clutch-plates in proportion to the power transmitted.

A further object of my invention, therefore, is in the provision of means whereby the pressure exerted between the clutch-plates, to cause their proper engagement, is a function of the power transmitted by the clutch.

To accomplish this object I may provide wedge-shaped or tapered surfaces connecting a component part of the clutch-mechanism with a shaft and through which tapered surfaces the driving torque is transmitted. The driving torque is resolved, by said tapered surfaces, into an axial component which operates to force said component part of the clutch-mechanism into engagement with other parts of said clutch-mechanism whereby the clutch engaging force is at all times a function of the torque or power transmitted by the clutch.

In reversing gearing of the type specified it is essential that a movement of the operating-lever to set the gearing for forward drive, for instance, shall be ineffective in moving the brake-mechanism into condition for reverse drive, and conversely, a movement of the operating-lever to set the gearing for reverse drive shall be ineffective in setting the gearing for forward drive.

A further object of my invention, therefore, is the provision of means associated with an operating-lever and the clutch-mechanism whereby the clutch-mechanism can be operated for forward drive of the gearing and the brake mechanism operated for reverse drive independently of each other from a neutral position of the operating-lever, in which position neither the clutch-mechanism nor brake-mechanism will be in engaged position and the reversing gearing will be in neutral position whereby the driving shaft may rotate without causing a corresponding rotation of the driven shaft.

To accomplish this object I may provide separate brake and clutch operating members normally constrained to move in unison under the influence of an operating-lever, by flexible means tending to normally maintain said members in contact but adapted for independent relative movement by the flexing of said flexible means upon the restraining of one of said members against movement, to permit further movement of the other of said members to operate its respective mechanism.

In the structure here shown for illustrating my invention the clutch-mechanism is adapted to be connected with the driven element and its clutching elements caused to engage each other for forward drive, and to be disconnected from the driven element and its clutching elements caused to disengage each other for neutral and reverse drive so that in neutral and reverse drive positions, particularly in reverse drive position, there will be no tendency for it to creep.

Broadly this feature forms the subject matter of my application No. 176,673 filed June 25, 1917, and the present invention therefore has for another object improvements in the structure by which the above results may be accomplished.

In carrying out this feature of my invention the clutch-mechanism includes a carrier for one set of clutch-plates connected with one of the components of the reverst drive gearing, as for instance, with the pinion carrier and an independent co-operating carrier for another set of clutch-plates adapted to be connected with the driven element and to serve as an actuating member for moving the clutch-plates into clutching engagement for forward drive and to be disconnected from the driven element and permit movement of the clutch-plates into disengaging position in neutral and reverse drive positions. Further objects of my invention involve the mechanical details of the construction of the reversing gearing.

Certain features herein shown are described in my co-pending applications, Serial No. 175,268, filed June 18, 1917; Serial No. 339,108, filed Nov. 19, 1919; Serial No. 344,532, filed Dec. 13, 1919.

In the figures:—

Figure 1 is a side elevation, partly in section, of a reversing gearing embodying my invention.

Fig. 2 is a section of the gearing along lines 2—2 of Fig. 1.

Fig. 3 is a sectional detail of the clutch-mechanism.

Fig. 4 is a plan view of the brake actuating-mechanism.

Fig. 5 is an end view of the gearing casing showing the toothed clutch plate carrier.

Fig. 6 is an end view of the toothed clutch operating member.

Fig. 7 is a sectional detail of the toothed engaging portion of the clutch plate carrier and operating member.

Fig. 8 is a side elevation of the operating handle.

Fig. 9 is a rear elevation of the same.

As here shown, the reversing gearing comprises a driving shaft 10 and a driven shaft 11, the proximate ends of which may terminate within the gearing casing and have secured thereto, by keys 12, the spur gears 13 and 14. A ball-bearing 15 is or may be concentrically disposed in the end of the bore of said gear 13, and the driven shaft 11 formed with a reduced end-portion 16 which fits within said bearing whereby the two shafts are held in axial alinement.

Said reversing gearing casing also includes a cylindrical or drum member 17 formed or provided with a radial inwardly extended wall 18 intermediate its length, which has extended from it a concentric hub 19 in which is disposed a bushing 20 which forms a bearing for the gearing casing on the shaft 11. End walls or plates 21 and 22 are secured respectively to the ends of said cylindrical member 17 by bolts 23 or other means. The wall 21 has extended from it a concentric hub 24 in which is disposed a bushing 25 which serves as a bearing for the gearing casing on the shaft 10. The gearing casing is rotatable with respect to the shafts but is held against axial movement by the spur gears which it incloses, which substantially fill the space between the walls 18 and 21. The cylindrical member also has an outer circumferential groove 26 in which is disposed a brake band 27, to be hereinafter more fully described.

The spur gears 13 and 14 which are secured respectively to said driving and driven shafts 10 and 11, are or may be different diameters, whereby a difference of speed of said shafts may be obtained when the gearing is operating in reverse drive. The spur gear 14, secured to the driven shaft is here shown as the larger of the two gears and in mesh with pinions 28, which are revolubly mounted on pins 29, secured in the walls 21 and 18 of the gearing casing; and said pinions 28 are made long enough to mesh with larger pinions 30, revolubly mounted on pins 31, secured to the gearing casing, which latter pinions 30 are in mesh with the spur gear 13 on the driving shaft.

Thus two planetary gearing elements are provided which are connected respectively with the driving and driven shafts and also together. These elements are employed for reverse drive for it will be seen that with the gearing casing restrained against rotation and consequently with the pins 29 and 31 restrained against rotation about said shafts 10 and 11, a rotary movement of the spur gear 13 secured to the driving shaft will transmit a rotary movement through the pinions 28 and 30 to the spur gear 14 secured to the driven shaft 11, and because of the interposition of two gears between said spur gears 13 and 14 said rotation of the driven shaft 11 will be in a reverse direction to the rotation of said driving shaft 10.

Furthermore it will be noted that such structure admits of a large amount of power being transmitted for reverse drive.

This structure represents one typical form of reverse drive mechanism with which my invention may be associated.

The clutch-mechanism which is associated with the reverse drive mechanism by means of which the two shafts 10 and 11 are connected for forward drive, is disposed within the space formed between the walls 18 and 22 of the casing, and comprises two sets of clutch-plates and carrying elements therefor, at least one of said elements being movable axially to cause the engagement of the clutch plates for actuation and engagement of the clutch. The clutch-plates of one set, as 32 have their outer edges of toothed formation adapting them to enter interdental spaces and slidably engage teeth 33 formed on the inner wall of a cylindrical portion of the member 17, which serves as a carrying element therefor. Said teeth serve as means for connecting the plates 32 to the casing against independent rotation therewith and at the same time provide means whereby said plates may be moved axially with respect to said casing, in an actuation of the clutch into engaged condition.

The clutch-plates of the other set, as 36, have their inner peripheries of toothed formation adapting them for relative sliding engagement with teeth 35 on the outer side of a hub 34 which is extended from an annular disk or flange 37, supported on the hub 19 of the wall 18, and which serves as a carrying element for said plates. Said teeth 35 serve as means for connecting the plates 36 to the carrying element against independent rotation therewith and at the same time provide means whereby said plates may be moved axially with respect to said element in an actuation of the clutch into engaged condition. Filler rings 38, of a thickness greater than the clutch-plates, are or may be disposed between the wall 18 and the clutch-plates. Said rings are for the purpose, in effect, of increasing the thickness of the wall 18 and disk 37 to compensate for the clearance at the ends of the grooves between said wall and the teeth, which is necessary in order to machine said teeth.

The clutch-plates 32 and 36 are alternately disposed and adapted to be compressed between said disk 37 and wall 18 of the clutch-plate carries to lock said clutch-plates against relative rotation, to provide for direct or forward drive of the gearing.

And one of said clutch-plate carriers as 37 is movable axially for the accomplishment of this result. Said carrier is moved axially by suitable operating mechanism which as here shown comprises an axially movable operating member slidably connected with the driven shaft but held against relative rotation with respect thereto, and link and lever mechanism connecting said member with suitable actuating means and adapted for manual operation, which will now be described.

The clutch-plate carrier is here shown as provided at that portion of its disk 37, adjacent the hub 34, with a circular series of radially formed tapered teeth 39, which are adapted to engage correspondingly formed teeth 40 on the clutch plate operating member 41 which is arranged on the driven shaft 11 by means of a spline 42 for axial movement, but against relative rotation, therewith. Said member 41 is circularly formed and adapted to be moved into and out of engagement with said clutch-plate carrier by means hereafter to be described, to condition the clutch for forward drive when in engagement and to disconnect the clutch from the driven element when out of engagement therewith.

Said teeth 39 and 40 upon the clutch plate carrier 37 and operating member 41 may have a width approximately equal to one half their pitch whereby to provide ample clearance space therebetween to facilitate engagement of the teeth 39 with the correspondingly formed teeth 40 on the clutch-plate operating member 41.

The operating member 41 is adapted for only a certain amount of axial movement along the driven shaft 11, under the control of the operating mechanism and toward the limit of its movement on said shaft sets the clutch for direct or forward drive.

To thus set the clutch the tops of the teeth 40 carried thereby are adapted to engage the clutch plate carrier between the teeth 39 thereon and move said carrier axially to cause a slight engagement of the clutch-plates. Due to this slight engagement of the plates, and because of the drag or friction between said plates, the clutch-plate carrier tends to rotate and this tendency toward rotation is sufficient to cause a slight angular movement of said carrier to move its teeth 39 into contact with the teeth 40 of the member 41. The contact between said teeth occurs on the inclined sides 42 thereof, and, due to the wedging action between their tapered surfaces, the tendency toward rotation of the clutch-plate carrier due to the drag between the clutch-plates causes a slight relative movement therebetween, one component of which is in an axial direction, which forces the clutch-plates into further and firmer non-slipping engagement.

Due to the tapered toothed surfaces between which the driving torque is transmitted from the clutch-plate carrier to the driven shaft 11, it is seen that there is no necessity for accurate or close axial adjustment between said carrier and the member 41. It is sufficient if the clutch-plates are in such engagement that a tendency toward rotation of the carrier is set up, whereupon, due to the wedging action of the toothed surfaces, the clutch-plates will be forced into secure engagement. Thus the clutch is self-adjusting and considerable wear may occur between the clutch-plates without causing the clutch to be ineffective in properly transmitting the driving torque.

The tapered toothed drive between the clutch-mechanism and the operating-mechanism also provides a means whereby the pressure between the clutch-plates is automatically varied in proportion to the resistance against rotation offered by the driven shaft. It is obvious that the greater the force transmitted between the tapered teeth, the greater will be the axial component of said force which acts to compress the clutch-plates into firmer engagement.

Such a result is highly advantageous in that the axial thrust may be at all times in proportion to the load and therefore, when the gearing is operating at any load less than its maximum designed load, the force between the clutch-plates and various components of the operating mechanism is correspondingly less, with a correspondingly increased life of the various parts, over the heretofore customary case in which the force exerted upon the clutch-plates by the operating mechanism is at all times sufficient for the greatest load the clutch is called upon to carry. In this respect the clutch is automatically adjustable.

The operating mechanism for the clutch includes a block or nut 43 threaded upon the driven shaft 11 and thereby axially adjustable thereon. A ring 44 is concentrically arranged over said threaded block 43 and is formed at one edge thereof with an inwardly extended thrust flange 45 adapted to engage said block. The other edge of said ring is formed with a plurality of spaced extensions or teeth 46 formed with an internal circumferential groove 46′ therein. A split resilient ring 48 is disposed in said groove and an edge thereof bears against the block 43. The flange 45 and split ring 48 thereby form means for locking said ring 44 on said block 43 against unintentional removal therefrom.

Block 43 is provided with a plurality of recesses 43′ in its outer circumference and a ball 50 disposed in a recess 51 in ring 44 is arranged to be pressed in said recesses 43' by a spring 52. Said spring is retained in its recess 51 by the cover 53 and said cover is maintained in place by the bolt 54 threaded into said thrust ring 44 and the end of which projects through said ring into the space between the ends of the resilient retaining ring 48 and thereby serves to lock said ring in position in said thrust ring.

Thrust ring 44 is formed with lugs or ears thereon and bell-crank levers, comprising arms 55 and 56, are pivoted thereto at 57. Said bell-crank levers form members of a toggle of the clutch operating mechanism of which the other members are the links 58 pivoted at 59 to the arms 55 and at 60 to lugs or ears formed on the clutch-plate operating member 41.

A thrust collar 61 having a radial flange 62, is arranged upon the driven shaft 11 for relative axial and rotative movement. Said collar 61 has a circumferential groove in which is disposed, for relative rotation therewith, a ring 61' having two diametrically opposed pins or trunnions 63 adapted to be engaged by a part of the operating mechanism to be hereinafter described for the purpose of imparting an axial movement to said thrust collar to cause a movement of the clutch between neutral and engaged positions.

The flange 62 of said thrust collar is formed with lugs 64 in which are pivoted, at 65, the links 66, the other ends of which links are pivoted, at 67, to the arms 56 of the bell-crank levers. Said pivots 67 are adapted to slide in slots 68 of links 69 pivoted to the member 41 at 60 and form means for preventing the movement of the toggles beyond the fully extended clutch operative position while permitting a movement of said toggles in a closing direction by a relative movement between the pivot pins 67 and the slot 68 of said links 69.

It is seen that a movement of the thrust collar toward the left, Fig. 1, into neutral or reverse drive causes the bell-crank levers to operate to break the toggles formed of the arms 55 and links 58 and to move member 41 toward the right or clutch disengaged position, see Fig. 3, permitting the clutch members to separate and to be without effect in controlling the rotation of the driven shaft. A movement of the thrust collar in the opposite direction into forward drive is effective in straightening the toggles and in moving the member 41 into clutch engaging position.

It is also seen that when the thrust collar is moved to extreme clutch disengaged position the teeth of member 41 and of the clutch plate carrier are free from engagement, so that not only is the clutch in disengaged condition but it is also disconnected from the driven element. In such condition, said carrier and associated plates are free to revolve or during reverse drive to remain stationary with the clutch-plates associated with the gearing casing as the case may be, and therefore there is no relative motion between the clutch-plates in said condition and no consequent loss of power therein, due to the drag or friction between said plates as is the case where certain of the clutch-plates are positively connected with the driven or driving shaft, or an element connected therewith.

The mechanism by means of which the clutch-mechanism and brake are controlled is mounted upon an operating shaft 70 disposed above the thrust collar in bearings 71 mounted upon suitable supports, not shown. Two depending arms 72 are loosely mounted on said shaft and are formed with slotted ends 73 in which are disposed the pins or trunnions 63 of the thrust collar 61. Said arms 72 are united by a yoke 74 whereby they may move in unison and form means whereby the thrust collar may be moved axially along the shaft 11 in the control of the clutch.

A hub 75 is secured to the shaft 70 between the arms 72; hence moves therewith, and an arm 76 extends from said hub to which a brake component is connected. Said hub and arm form means whereby the brake-mechanism may be operated for reverse drive.

The yoke 74 has an upwardly extended ear 77 in which, at 78 a bolt 79 is pivoted. Said bolt 79 extends through an enlarged portion 80 of the brake operating arm 76 and a coil spring 81 is disposed thereon. A tubular sleeve 82 is secured to said bolt over the spring 81 and serves to substantially inclose said spring. Bolt 79 is threaded at the end thereof and an adjusting nut 83 is secured thereon, thereby maintaining said spring and said sleeve on the bolt against unintentional removal therefrom. Spring 81 is provided, as the end thereof adjacent the brake operating arm 76, with a spherically formed disk member 84, which bears in a correspondingly formed seat in said arm 76.

It is seen that spring 81 forms means by which the brake arm 76 and clutch collar operating arms 72 are normally maintained in engagement through the lug or ear 77 of the yoke 74 and are adapted for normal simultaneous movement.

Upon the restraining of the clutch arms 72 against angular movement, however, the brake arm is permitted relative movement therewith, upon compression of the spring 81, therefore said spring forms means whereby the clutch arms and brake arm are normally maintained against independent movement and yet arranged for relative movement.

An operating handle 85 is secured to the operating shaft 70 adjacent one of its supports 71, and a spring-pressed toothed latch 86 is pivoted to it at 87. Said latch is maintained in normal engagement with a sector 88 by a spring 89. Approximately one half of said sector is provided with teeth and said latch 86 is adapted to engage said teeth in any position of the operating handle 85 from the vertical or neutral position to the reverse drive position. When said operating handle is in position for reverse drive, the action of the spring 81 is such as to tend to return said handle to vertical position and this tendency is resisted by the latch engaging the teeth of said sector 88. That portion of the sector between neutral and forward drive position of the operating handle is devoid of teeth for the reason that, in forward drive, the toggle mechanism locks the clutch in engaged position and there is therefore no force tending to displace the operating handle from set position. The latch 86 may be removed from engagement with the toothed sector 88 by the customary rod 90 and pivotally attached member 91, the pressing of which member 91 causes the latch to be raised from engagement with said sector.

The brake-mechanism, by means of which the gearing is conditioned for reverse drive, includes the brake band 27 which is disposed in the groove 26 in the gearing casing as has been previously explained. Said band may be formed of more or less resilient material or may be so constructed that the movement of the ends thereof into proximity causes it to engage said casing to maintain it against rotation and said band is provided with means, not shown, whereby it is also maintained against rotation.

The ends 92 and 93 of said band are formed with lugs 94 and 95, see Fig. 4, in staggered relation, there being two lugs 95 on the end 93, and one lug 94 on the end 92, opposite the space between the lugs 95. Slotted bars 96 and 97 are supported by said lugs, in parallel relation. The bars 97 are fixed to the lugs 95 by nuts 98, and bar 96 has a threaded extension 99 disposed in lug 94, and a nut 100 secured to the end thereof whereby said bar is adjustable longitudinally. Such adjustment provides means for compensating for wear of the brake.

Rollers 101 are pivoted to the ends of said bars 96 and 97 at 102.

A long flat bar 103 having an end-portion 104 formed with cam faces along its sides is disposed in said slotted bars 96 and 97, and its other end is secured to link 106 pivoted at 107 to the brake operating arm 76.

The cam-faced end 104 of said bar 103 has flat parallel portions 108 terminating in recessed portions 109 from which extend outwardly inclined cam surfaces 110. The rollers 101, pivoted to the rods 96 and 97 secured to the ends of the brake band 27, are adapted to engage said surfaces, upon a movement of said bar 103 caused by a movement of the operating handle.

Because of the parallel surfaces 108, it is seen that said rod is permitted a certain amount of longitudinal movement without operating to expand or contract said brake band, and said movement of the bar 103 and the associated mechanism is thereby ineffective in operating said brake to obtain reverse drive in such movement. During such movement the operating mechanism is however, effective in moving the clutch between neutral and forward drive position.

A movement of said bar 103 in a direction toward the right, Fig. 4, causes the rollers to pass from the flat, parallel cam portions 108 to the notched portions 109 in which position the clutch-mechanism is arranged to be in neutral and the engagement of the rollers 101 with said notched or recessed portions 109 tends to maintain the operating mechanism and brake in neutral and consequently disengaged position.

A continued movement of said bar 103 causes the tapered or inclined portions 110 to engage the roller 101 to cause the ends of said brake band 27 to be drawn together and to so contract said band around the gearing casing as to tend to restrain said casing against relative movement therewith. In such position of bar 103 and brake band, the gearing is in condition for reverse drive.

In the position of the operating handle and mechanism shown in Fig. 1, the gearing is in condition for direct or forward drive with the clutch in engaged position. In such position of the operating mechanism, the spring 81 serves to maintain the clutch operating arms 72 and the brake arm 76 in contact, through the interposition of the lug or ear 77 formed on the yoke 74, and said arms are adapted for normal simultaneous movement. In such position of the mechanism, the brake band rollers 101 are in contact with the parallel cam portions of the brake bar 103.

Upon a movement of the operating handle toward the right and into a vertical or neutral position, the motion of said handle is transmitted through the brake arm 76 and spring 81 to the clutch arms 72, which are thereby angularly moved to slide the thrust collar on the driven shaft 11 toward the left to break the toggles formed of links 58 and arms 55 of the bell-crank levers, and to move the clutch plate carrier operating member 41 toward the right and form engaging position with the teeth of the clutch plate carrier. The clutch-plates, being no longer forced into engagement, tend to separate, due to their resiliency, and the clutch is thereby in disengaged condition, in which condition the driving shaft 10 and driven shaft 11 are adapted for independent rotation.

The continued axial movement of the member 41 causes its complete disengagement from the teeth of the clutch-plate carrier, which is thereby free from the driven shaft 11 and causes the abutment of said member 41 with the block or nut 43, thereby preventing further axial movement of said member in that direction. In such abutting position, the clutch and associated mechanism is in neutral position.

The movement of the brake rod 103 in such movement of the clutch from engaged to neutral position has been ineffective to contract the brake band 27, the roller 101 secured to the ends thereof being merely engaged with the parallel cam portion 108 of said rod and, in the neutral position of the mechanism, being positioned in the recessed portions 109.

Upon a movement of the operating handle from neutral to reverse position, the clutch arms 72 are restrained against further movement in said direction because of the abutment of the member 41 with the nut 43 secured upon the driven shaft 11 and the further movement of the operating handle and brake arm 76 is permitted through the compression of spring 81.

It will be noted that during such movement the clutch continues to remain in disengaged condition and the clutch-mechanism continues to be disengaged from the driven shaft or element, so that it will continue to remain stationary during reverse drive as it did while in neutral, that is to say, without tendency to creep along.

Such movement of the operating handle causes the engagement of the tapered surfaces 110 of the brake rod 105 with the rolls 101 of the brake band 27 and the consequent contraction of said band about the gearing casing thereby tends to restrain said casing against rotation and thereby conditions the gearing for operation in reverse drive. The tendency of the spring 81 to restore the operating mechanism, to neutral position is resisted by the engagement of the latch 86 carried by the operating handle 85 with the toothed section 88.

The movement of the operating handle from reverse drive to neutral position, permissible by the unlatching of said handle, returns the operating mechanism and permits the extension of spring 81 until the brake arm 76 is in contact, through ear 77, with the clutch arm 72, whereupon a continued movement of the operating handle into forward drive causes the simultaneous movement of the brake and clutch operating mechanism. The consequent straightening of the clutch operating toggle operates the member 41 into engagement with the teeth of the clutch plate carrier whereupon the action of the mechanism to cause engagement of the clutch to secure forward drive is as has been heretofore explained.

It will be understood that herein the terms gears, gearing, and the expression "gearing adapted to connect the shafts for reverse drive", are names given to elements and groups of elements which perform the function of gears.

I claim:

1. In a reversing gearing, a driving shaft, a driven shaft, gearing adapted to connect said shafts for reverse drive, clutch mechanism comprising two clutching elements adapted to engage each other for direct drive and to disengage each other on reverse drive, one of said elements being connected with one of said shafts and means to connect the other element with the other shaft for forward drive and to clutch the elements and operating means for the aforesaid means.

2. In a reversing gearing, a driving shaft, a driven shaft gearing adapted to connect said shafts for reverse drive, clutch-mechanism comprising two clutching elements adapted to engage each other for direct drive and to disengage each other on reverse drive, one of said elements being connected with one of said shafts and means to connect the other element with the other shaft for forward drive and to clutch the elements and to disengage it therefrom on reverse drive and unclutch the elements and operating means for the aforesaid means.

3. In a reversing gearing, a driving-shaft, a driven-shaft, gearing adapted to connect said shafts for reverse drive, clutch-mechanism comprising two clutching elements adapted to engage each other for forward drive and to disengage each other for reverse drive, one of said elements being connected with a component of the reverse drive gearing, and an axially movable member rotatably connected with the driven element which is movable into engagement with the other element for forward drive and out of engagement therewith for reverse drive.

4. In a reversing gearing, a driving-shaft, a driven-shaft, gearing adapted to connect said shafts for reverse drive, clutch-mechanism comprising two clutching elements adapted to engage each other for forward drive and to disengage each other for reverse drive, one of said elements being connected with a component of the reverse drive gearing, and an axially movable member rotatably connected with the driven element which is movable into engagement with the other element for forward drive and out of engagement therewith for neutral and reverse drive.

5. In a reversing gearing, a driving-shaft, a driven-shaft, gearing adapted to connect said shafts for reverse drive, clutch-mechanism comprising two clutching elements adapted to engage each other for forward drive and to disengage each other for reverse drive, one of said elements being connected with a component of the reverse drive gearing and means to directly connect the other element with the driven element on forward drive and engage the elements thereof and disconnect it therefrom on reverse drive, and disengage the elements thereof.

6. In the reversing gearing, the driving-shaft, a driven-shaft, gearing adapted to connect said shafts for reverse drive, clutch-mechanism comprising two clutching elements adapted to engage each other for forward and to disengage each other on reverse drive, and axially movable elements rotatively connected with the driven element for rotating and axially moving one of said clutching elements.

7. In a reversing gearing, the driving-shaft, a driven-shaft, gearing adapted to connect said shafts for reverse drive, clutch-mechanism comprising two clutching elements adapted to engage each other for forward and to disengage each other on reverse drive, a member connected to rotate with the driven shaft and movable axially with respect thereto, arranged to rotate one of said clutching elements and move it into engagement with the other clutching element.

8. In a reversing gearing, a driving-shaft, a driven-shaft, gearing adapted to connect said shafts for reverse drive, clutch-mechanism comprising two carriers for the clutch plates, one of said carriers being connected with a component of the reverse drive gearing, and a member rotatively connected with the driven shaft, and axially movable with respect thereto for engaging the other carrier to rotate and move it to engage the clutch plates.

9. In a reversing gearing, a driving-shaft, a driven shaft, gearing adapted to connect said shafts for reverse drive, clutch-mechanism comprising a carrier for a set of clutch plates connected with a component of the reverse drive gearing, and another carrier for an alternating set of clutch plates which is made normally free from driving connection with other clutch components and a member rotatively connected with the driven element, and axially movable with respect thereto for engaging and rotating the other carrier and moving it to engage the clutch plates.

10. In a reversing gearing, a driving shaft, a driven-shaft, gearing adapted to connect said shafts for reverse drive, clutch-mechanism comprising two carriers for the clutch plates, one of said carriers being connected with a component of the reverse drive gearing, and a member rotatively connected with the driven element, and axially movable with respect thereto for engaging the other carrier and moving it to engage the clutch plates for forward drive and for disengaging said carrier and for permitting movement thereof for disengagement of the clutch-plates on reverse drive.

11. In a reversing gearing, a driving-shaft, a driven-shaft, gearing adapted to connect said shafts for reverse drive, clutch-mechanism comprising two carriers for the clutch-plates, one of said carriers being connected with a component of the reverse drive gearing, and a member rotatively connected with the driven element, and axially movable with respect thereto for engaging the other carrier and moving it to engage the clutch plates for forward drive and for disengaging said carrier and for permitting movement thereof for disengagement of the clutch-plates on neutral and reverse drive.

12. In a reversing gearing, a driving-shaft, a driven-shaft, gearing connecting said shafts for reverse drive comprising a spur-gear on each shaft, planetary pinions engaging each spur gear, other planetary pinions engaging the aforesaid pinions, a carrier for the pinions having a toothed extension and an end wall arranged at right angles relative to each other to form a space, clutch plates arranged in said space in front of said end wall, some being slidably connected with said toothed extension, and an axially movable member comprising a toothed portion and an end wall arranged at right angles relative to each other and located in front of said clutch plates to which other clutch plates are slidably connected, for moving the clutch plates in a direction toward the other end wall to increase the contact pressure therebetween, and means to move said member.

13. In a reversing gearing, a driving-shaft, a driven-shaft, gearing directly connecting said shafts for reverse drive, clutch-mechanism adapted to connect said shafts for forward drive, and self-adjusting actuating mechanism for said clutch-mechanism whereby the clutching pressure is automatically varied according to variations in the load.

14. In a reversing gearing, a driving shaft, a driven-shaft, gearing directly connecting said shafts for reverse drive, clutch-mechanism adapted to connect said shafts for forward drive, and actuating mechanism for said clutch-mechanism involving adjustable components whereby the clutching pressure is varied according to variations in the load.

15. In a reversing gearing, a driving-shaft, a driven-shaft, gearing directly connecting said shafts for reverse drive, clutch-mechanism adapted to connect said shafts for forward drive, and adjustable means to actuate said mechanism, whereby the clutching pressure is varied according to variations in the load.

16. In a reversing gearing, a driving-shaft, a driven-shaft, gearing directly connecting said shafts for reverse drive, clutch-mechanism adapted to connect said shafts for forward drive, and automatically adjustable means to actuate said mechanism, whereby the clutching pressure is varied according to variations in the load.

17. In a reversing gearing, a driving-shaft, a driven-shaft, gearing directly connecting said shafts for reverse drive, clutch-mechanism adapted to connect said shafts through said gearing for forward drive, and actuating mechanism for said clutch-mechanism adapted for adjustment, whereby the clutching pressure is varied according to variations in the load.

18. In a reversing gearing, a driving-shaft, a driven-shaft, gearing directly connecting said shafts for reverse drive, clutch-mechanism adapted to connect said shafts through said gearing for forward drive, and actuating-mechanism for said clutch-mechanism adapted for automatic adjustment, whereby the clutching pressure is varied according to variations in the load.

19. In a reversing gearing, a driving-shaft, a driven-shaft, gearing directly connecting said shafts for reverse drive, clutch-mechanism adapted to connect said shafts for forward drive including adjustable means connecting components of said mechanism adapted for adjustment upon an angular movement of a component of the clutch-mechanism to vary the clutching pressure according to variations in the load.

20. In a reversing gearing, a driving-shaft, a driven-shaft, gearing directly connecting said shafts for reverse drive, clutch-mechanism adapted to connect said shafts for forward drive, including adjustable means connecting components of said mechanism adapted for adjustment upon an angular movement of a component of the clutch-mechanism through the connected gearing for reverse drive to vary the clutching pressure according to variations in the load.

21. In a reversing gearing, a driving-shaft, a driven-shaft, gearing directly connecting said shafts for reverse drive, clutch-mechanism adapted to connect said shafts for forward drive, actuating mechanism for said clutch mechanism, said clutch and actuating mechanism being movable angularly with respect to each other for purposes of adjustment.

22. In a reversing gearing, a driving-shaft, a driven-shaft, gearing adapted to connect said shafts for reverse drive, clutch-mechanism comprising two clutching elements adapted to engage each other for forward drive and to disengage each other for reverse drive, one of said elements adapted to be connected with one of said shafts on reverse drive, and means to connect the other element with the other shaft for forward drive and to disconnect it therefrom on reverse drive, said means being adjustable to vary the clutching pressure according to variations in the load.

23. In a reversing gearing, a driving-shaft, a driven-shaft, gearing adapted to connect said shafts for reverse drive, clutch-mechanism comprising two clutching elements adapted to engage each other and to be connected with the driven element for forward drive and to disengage each other and to be disconnected from the driven element for reverse drive and operating means for said clutching elements, said means being adjustable to vary the clutching pressure according to variations in the load.

24. In a reversing gearing, a driving-shaft, a driven-shaft, gearing adapted to connect said shaft for reverse drive, clutch-mechanism adapted to connect said shafts for forward drive, actuating-mechanism for said clutch-mechanism movable in one direction from neutral for forward drive, and being immovable in the other direction from neutral, thereby remaining stationary during reverse drive operation, and operating-mechanism for said actuating-mechanism and said reverse drive gearing said means being adjustable to vary the clutching pressure according to variations in the load.

25. In a reversing gearing, a driving-shaft, a driven-shaft, gearing adapted to connect said shafts for reverse drive, clutch-mechanism adapted to connect said shafts for forward drive, having an actuating-member, actuating-mechanism for said member, movable in one direction from neutral for forward drive and being immovable in the other direction from neutral, thereby remaining stationary during reverse drive operation, and operating-mechanism for said actuating-mechanism and said reverse drive gearing, said means being adjustable to vary the clutching pressure according to variations in the load.

26. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in reverse drive position, whereby it will remain stationary, the actuating-means for said clutch-mechanism being adjustable to vary the clutching pressure according to variations in the load.

27. In a reversing gearing, a driving-shaft, a driven-shaft, gearing adapted to connect said shafts for reverse drive, clutch-mechanism comprising two clutching elements adapted to engage each other for forward drive and to disengage each other on reverse drive, one of said elements being connected with one of said shafts and means to directly connect the other element with the other shaft for forward drive and to clutch the elements and operating means for the aforesaid means, said aforesaid means being adjustable to vary the contact pressure according to variations in the load.

28. In a reversing gearing, a driving-shaft, a driven-shaft, gearing adapted to connect said shafts for reverse drive, clutch-mechanism comprising two clutching elements adapted to engage each other for forward drive and to disengage each other on reverse drive, one of said elements being connected with one of said shafts and means to directly connect the other element with the other shaft for forward drive and to clutch the elements and to disengage it therefrom on reverse drive and unclutch the elements and operating means for the aforesaid means, said aforesaid means being adjustable to vary the contact pressure according to variations in the load.

29. In a reversing gearing, a driving-shaft, a driven-shaft, gearing adapted to connect said shafts for reverse drive, clutch-mechanism comprising two clutching elements adapted to engage each other for forward drive and to disengage each other for reverse drive, one of said elements being connected with a component of the reverse drive gearing, and an axially movable member rotatably connected with the driven element which is movable into engagement with the other element for forward drive and out of engagement therewith for reverse drive, said member serving as an actuating-member and being adjustable to vary the clutching pressure according to variations in the load.

30. In a reversing gearing, a driving-shaft, a driven-shaft, gearing directly connecting said shafts for reverse drive, clutch-mechanism adapted to connect said shaft for forward drive, operating-mechanism for said clutch-mechanism, and means arranged between said clutch-mechanism and operating-mechanism admitting of a relative angular movement of said mechanisms.

31. In a reversing gearing, a driving-shaft, a driven-shaft, gearing directly connecting said shaft for reverse drive, clutch-mechanism adapted to connect said shafts for forward drive, operating-mechanism for said clutch-mechanism, and means associated with the reverse-drive gearing to render said operating-mechanism effective to effectively operate said clutch-mechanism upon wear between the clutch members.

32. In a reversing gearing, a driving-shaft, a driven-shaft, gearing directly connecting said shafts for reverse drive, clutch-mechanism adapted to connect said shafts for forward drive, operating-mechanism for said clutch-mechanism, and means associated with the clutch and operating-mechanism to render said operating mechanism effective to effectively operate said clutch upon wear between the members composing said mechanisms.

33. In a reversing gearing, a driving shaft, a driven-shaft, gearing adapted to connect said shafts for reverse drive, clutch-mechanism adapted to connect said shafts for forward drive and operating-mechanism for said clutch-mechanism, having clutching means adapted to connect it with said clutching-mechanisms.

34. In a reversing gearing, a driving-shaft, a driven-shaft, gearing adapted to connect said shafts for reverse drive, clutch-mechanism adapted to connect said shafts for forward drive and operating-mechanism for said clutch-mechanism, elements of said mechanisms having toothed components for connecting said mechanisms.

35. In a reversing gearing, a driving-shaft, a driven-shaft, gearing adapted to connect said shafts for reverse drive, clutch-mechanism adapted to connect said shafts for forward drive, and operating-mechanism for said clutch-mechanism, said mechanisms being normally rotatably independent of each other but arranged for engagement to condition the gearing for forward drive.

36. In a reversing gearing, a driving-shaft, a driven-shaft, gearing adapted to connect said shafts for reverse drive, clutch-mechanism adapted to connect said shafts for forward drive and operating-mechanism for said clutch-mechanism, elements of said mechanism having means connecting them permitting a relative simultaneous axial and rotative movement therebetween in the conditioning of the clutch-mechanism for forward drive.

37. In a reversing gearing, a driving-shaft, a driven-shaft, gearing adapted to connect said shafts for reverse drive, clutch-mechanism adapted to connect said shafts for forward drive and operating-mechanism for said clutch mechanism, elements of said mechanisms having coöperating cam surfaces thereby permitting a relative simultaneous axial and rotative movement between the mechanisms in the conditioning of the clutch-mechanism for forward drive.

38. In a reversing gearing, a driving-shaft, a driven-shaft, gearing adapted to connect said shafts for reverse drive, clutch-mechanism adapted to connect said shafts for forward drive and operating-mechanism for said clutch-mechanism, said mechanisms having clutching means connecting said mechanisms, said means having cam surfaces thereby permitting a relative simultaneous axial and rotative movement therebetween in the conditioning of the clutch-mechanism for forward drive.

39. In a reversing gearing, a driving-shaft, a driven-shaft, gearing adapted to connect said shafts for reverse drive, clutch-mechanism adapted to connect said shafts for forward drive and operating-mechanism for said clutch-mechanism, said mechanisms having means operating to vary the pressure causing the engagement of said clutch mechanism as a function of the torque transmitted by said clutch-mechanism.

40. In a reversing gearing, a driving-shaft, a driven-shaft, gearing adapted to connect said shafts for reverse drive, clutch-mechanism adapted to connect said shafts for forward drive and operating-mechanism for said clutch-mechanism, said mechanisms having means connecting them operating to vary the clutching pressure as a function of the torque transmitted by said clutch-mechanism.

41. In a reversing gearing, a driving-shaft, a driven-shaft, gearing adapted to connect said shafts for reverse drive, clutch-mechanism adapted to connect said shafts for forward drive, operating-mechanism for said clutch-mechanism, said clutch-mechanism being normally rotatably independent of said operating mechanism and including a toothed member, and toothed means arranged to be moved into engagement with said toothed clutch member by said operating mechanism to condition the gearing for forward drive.

42. In a reversing gearing, a driving-shaft, a driven-shaft, gearing adapted to connect said shafts for reverse drive, clutch-mechanism adapted to connect said shafts for forward drive, said clutch-mechanism including a clutch-member unrestrained against axial or rotative movement relative to the gearing and means to effectively restrain said member from independent movement therewith to condition the gearing for forward drive.

43. In a reversing gearing, a driving-shaft, a driven-shaft, gearing adapted to connect said shafts for reverse drive, clutch-mechanism adapted to connect said shafts for forward drive, said clutch-mechanism including a clutch member unrestrained against axial or rotative movement relative to the gearing, said member having a cam shaped portion, operating-mechanism for said clutch-mechanism including a member axially movable relative to one of said shafts, and having a corresponding cam shaped portion, said member being axially movable along said shaft to cause the engagement of the cam shaped portions to condition the clutch-mechanism for forward drive and said cam shaped engaging portions permitting a relative axial and rotative movement therebetween whereby to provide for the effective engagement of the clutch upon wear between the clutch members.

44. In a reversing gearing, a driving-shaft, a driven-shaft, gearing adapted to connect said shafts for reverse drive including brake-mechanism, clutch-mechanism adapted to connect said shafts for forward drive, operating-mechanism for said brake and clutch-mechanisms having means admitting of normal simultaneous movement of said mechanisms by said operating-mechanism and arranged to permit a relative movement of said mechanisms under certain movements of said operating-mechanism.

45. In a reversing gearing, a driving-shaft, a driven-shaft, gearing adapted to connect said shafts for reverse drive, including brake-mechanism, clutch-mechanism adapted to connect said shafts for forward drive, operating-mechanism for said brake and clutch-mechanisms and resilient means arranged to constrain said clutch and brake mechanisms to move in unison and arranged to permit a relative movement of said mechanisms under certain movements of said operating-mechanism.

46. In a reversing gearing, a driving-shaft, a driven-shaft, gearing adapted to connect said shafts for reverse drive, including brake mechanism, clutch-mechanism adapted to connect said shafts for forward drive, operating-mechanism for said brake and clutch-mechanisms, and resilient means arranged to constrain the clutch and brake mechanisms for simultaneous movement and arranged to permit a relative movement of said mechanisms by the resiliency of said means under certain movements of said operating mechanism.

47. In a reversing gearing, a driving-shaft, a driven-shaft, gearing adapted to connect said shafts for reverse drive including brake-mechanism, clutch-mechanism adapted to connect said shafts for forward drive, operating-mechanism for said brake and clutch-mechanisms, and a spring adapted to constrain component parts of said clutch and brake-mechanisms in engagement whereby said mechanisms are arranged for normal simultaneous movement and to permit a continued movement of one of said mechanisms for the restraining of the other against movement by the compression of said spring.

In testimony whereof, I have signed my name to this specification, in the presence of one subscribing witness.

HENRY A. TUTTLE.

Witness:
H. B. DAVIS.